United States Patent
Sokn

[19]

[11] Patent Number: 5,831,170
[45] Date of Patent: Nov. 3, 1998

[54] PRESSURE SENSOR PACKAGE AND METHOD OF MAKING THE SAME

[75] Inventor: Erick L. Sokn, Janesville, Wis.

[73] Assignee: SSI Technologies, Inc., Janesville, Wis.

[21] Appl. No.: 627,618

[22] Filed: Apr. 4, 1996

[51] Int. Cl.$^6$ .................................................. G01L 7/00
[52] U.S. Cl. .............................. 73/706; 73/715; 29/505; 29/523
[58] Field of Search .................... 73/715, 706; 29/505, 29/523; 220/378; 215/270, 271

[56] References Cited

U.S. PATENT DOCUMENTS

| | | | |
|---|---|---|---|
| 1,868,018 | 7/1932 | Miner | 73/706 |
| 3,322,890 | 5/1967 | Kennedy et al. | 174/152 |
| 3,398,333 | 8/1968 | Zeppieri | 317/230 |
| 3,897,131 | 7/1975 | Stauffer | 339/220 |
| 3,909,924 | 10/1975 | Vindasius et al. | 29/574 |
| 4,047,790 | 9/1977 | Carino | 339/220 |
| 4,109,535 | 8/1978 | Reed et al. | 73/715 X |
| 4,148,408 | 4/1979 | Wolf | 220/200 |
| 4,379,279 | 4/1983 | Nasiri | 338/42 |
| 4,454,398 | 6/1984 | Aschenbach et al. | 200/302.3 |
| 4,525,022 | 6/1985 | Murray | 339/220 |
| 4,655,088 | 4/1987 | Adams | 73/756 |
| 4,686,764 | 8/1987 | Adams et al. | 29/592 |
| 4,732,042 | 3/1988 | Adams | 73/706 |
| 4,744,863 | 5/1988 | Guckel et al. | 156/653 |
| 4,842,685 | 6/1989 | Adams | 156/308.2 |
| 4,853,669 | 8/1989 | Guckel et al. | 338/4 |
| 4,907,983 | 3/1990 | Wilson | 439/278 |
| 4,965,697 | 10/1990 | Mosser et al. | 338/36 |
| 4,996,082 | 2/1991 | Guckel et al. | 427/99 |
| 5,095,755 | 3/1992 | Peterson | 73/706 |
| 5,144,843 | 9/1992 | Tamura et al. | 73/727 |
| 5,184,107 | 2/1993 | Maurer | 338/42 |
| 5,212,989 | 5/1993 | Kodama et al. | 73/706 |
| 5,285,690 | 2/1994 | Koen et al. | 73/727 |
| 5,341,684 | 8/1994 | Adams et al. | 73/721 |

FOREIGN PATENT DOCUMENTS

| | | | |
|---|---|---|---|
| 0 467 677 A2 | 7/1991 | European Pat. Off. | G01L 7/08 |
| 0 545 319 A2 | 11/1992 | European Pat. Off. | G01L 9/06 |
| 0 674 360 A1 | 9/1995 | European Pat. Off. | H01R 13/41 |
| 94 06 625 U | 7/1994 | Germany | G01L 9/00 |
| 44 10 455 C1 | 6/1995 | Germany | H01R 13/405 |
| WO94/04897 | 3/1994 | WIPO | G01L 7/08 |

OTHER PUBLICATIONS

*Siemens Aktiengesellschaft,* Temeperature and Pressure Sensor Data Book, (1990–1991); pp. 93–97.

Motorla Pressure Sensor Device Data; Motorola, Inc. 1990.

Eugene Svoboda, "Passive Compensation of a Monolithic Silicon Pressure Transducer", Sensym, Inc., 1986.

P.E.M. Frere, S.J. Prosser, "Temperature Compensation of Silicon Pressure Sensors For Automatic Applications", Lucas Research Centre, Lucas Engineering & Systems Ltd., U.K., pp. 270–274.

Yamada, et al., "A Piezoresistived Integrated Pressure Sensor", *Sensors and Actuators,* 4 (1983); pp. 63–69.

(List continued on next page.)

*Primary Examiner*—Joseph L. Felber
*Attorney, Agent, or Firm*—Michael Best & Friedrich LLP

[57] ABSTRACT

A pressure sensor package and a method of producing the same. The package includes a pressure sensor base, a pressure sensor diaphragm positioned over the base, and a sealing ring positioned over the pressure sensor diaphragm and creating an interference fit with the pressure sensor base. The sealing ring forms a mechanical interference with the pressure sensor base by either positioning the ring within an under cut in a sidewall of the base or deforming a portion of the base over the top of the ring. The pressure sensor base includes a recess having a bottom surface and a groove in the bottom surface, and the sealing ring and/or the pressure sensor diaphragm is positioned within the groove. The package further includes external threads for securing the package to a threaded orifice, the external threads being positioned on the output side of the package, as defined by the diaphragm.

7 Claims, 2 Drawing Sheets

OTHER PUBLICATIONS

Xian–Ping Wu, et al., "An Integrated Pressure Transducer For Biomedical Applications", *Sensors and Actuators,* 2 (1982); pp. 309–320.

Willig, "Operational Amplifiers", *EXAMplifications,* May/Jun. 1993; pp. 256–258.

Poff, "Stable Miniature Pressure Transducer Using Inorganic Bonding Construction", Endevco Corporation, 1987; pp. 373–382.

Williams, "Good bridge–circuit design satisfies gain and balance criteria", *EDN Designers' Guide to Bridge Circuits,* Oct. 25, 1990; pp. 161–174.

Dresser Industries Brochure—Ashcroft "Model K1 Thin Film Pressure Transmitter".

Sensotec Brochure—"Subminiature Pressure Transducers", pp. 10–11.

Schultz, "Amplifiers for Semiconductor Pressure Sensors", Motorola Semiconductor Products, pp. 291–298.

Korane, "Silicon for High–Pressure Sensing", *Machine Design,* May 11, 1989; pp. 64–70.

Bicking, et al., "Sensor Packaging For High Volume Applications", IEEE 1985, pp. 350–351.

Kistler Measuring with Crystals; Kistler Instruments AG.

Industrial Pressure Transducer Model P27E Type, Trans–Metrics, Inc.

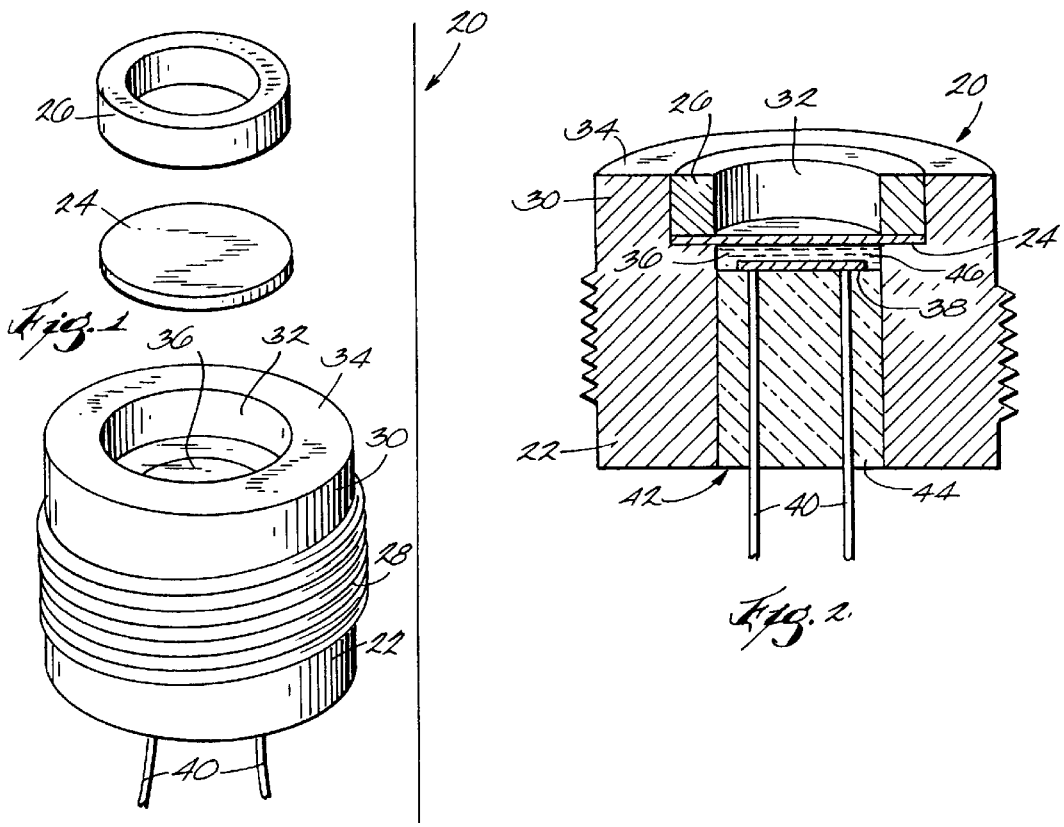
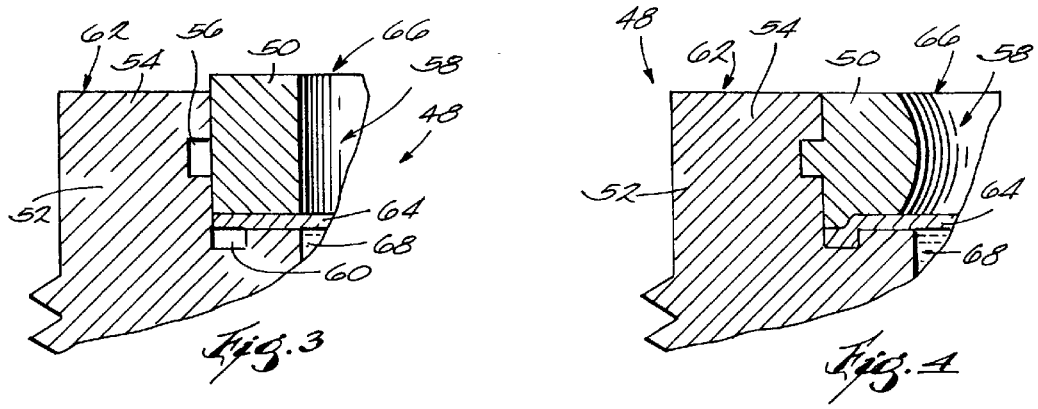
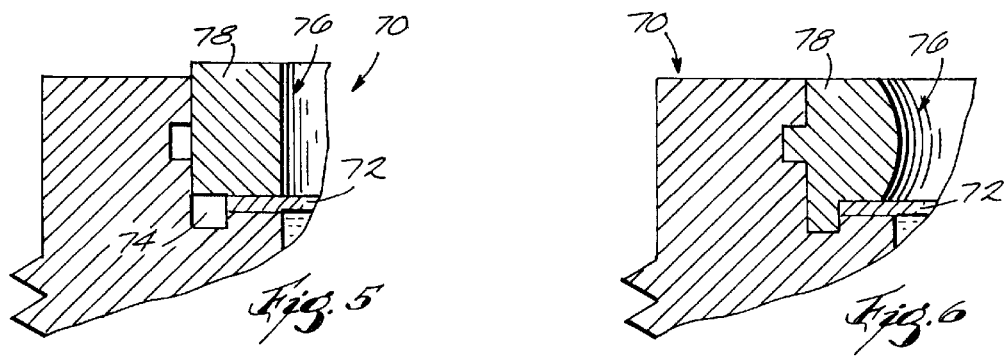

PRESSURE SENSOR PACKAGE AND METHOD OF MAKING THE SAME

FIELD OF THE INVENTION

The present invention generally relates to the field of pressure sensor packages, and more specifically to pressure sensor packages having a pressure chip sealed within a cavity by a diaphragm.

BACKGROUND OF THE INVENTION

Pressure sensors are used in a variety of areas, such as automotive and industrial applications, to provide an electrical signal corresponding with fluid pressure. For example, pressure sensors can be used to measure automotive oil pressure and hydraulic fluid pressure.

One type of pressure sensor includes a solid state pressure sensing bridge, or chip, for generating an electrical signal corresponding with fluid pressure applied to the chip. Typically, the chip is mounted within a cavity of a base, and a fluid medium (e.g., silicone gel) is placed within the cavity to cover the chip. A diaphragm is secured to the base over the cavity to secure the gel in place in the cavity, and to create a sealed pressure sensor package. Alternatively, the gel can be injected into the cavity through a separate port after the diaphragm is secured in place. In operation, pressure applied to the diaphragm deflects the diaphragm, and is transmitted by the fluid medium to the chip.

The diaphragm is commonly secured to the base by welding. Welding provides an adequate seal, but the operation can only be performed if both the base and the diaphragm are made of compatible metallic materials. In addition, the welding operation can be expensive, and can cause heat distortion of the components. Also, the welding typically must be done without the fluid medium in the cavity, thereby requiring the extra operations of injecting the fluid medium into the cavity and thereafter sealing the cavity without causing unacceptable offset pressure in the cavity.

SUMMARY OF THE INVENTION

In one aspect, the present invention provides a method by which the diaphragm can be secured to the base without the need for a welding operation. Since no welding is required, the diaphragm and base can be made from a wider range of materials, such as non-metallic materials. Also, this new method can be performed with the fluid medium in the cavity, thereby eliminating the secondary operations of injecting the cavity with fluid medium and sealing the cavity.

The method includes the steps of positioning the pressure sensor diaphragm over a pressure sensor base, placing a sealing ring over the pressure sensor diaphragm, and creating an interference fit between the sealing ring and the pressure sensor base. The sealing ring can be formed separate from or integral with the pressure sensor diaphragm. In one embodiment, the step of creating an interference fit includes plasticly deforming (e.g., compressing) the sealing ring and/or the pressure sensor diaphragm. In another embodiment, the pressure sensor base includes a recess having a bottom surface and a groove in the bottom surface, and the method further includes the step of plasticly deforming the sealing ring and/or the pressure sensor diaphragm into the groove.

In yet another embodiment, the step of creating an interference fit includes the step of forming a mechanical interference between the pressure sensor base and the sealing ring. For example, the step of forming a mechanical interference can include the step of plasticly deforming the sealing ring into an undercut in a sidewall of the pressure sensor base. In addition or alternatively, the step of forming a mechanical interference can include the step of deforming a portion of the pressure sensor base over a portion of the sealing ring.

In another aspect, the present invention provides a pressure sensor package wherein the diaphragm is secured to the base by a sealing ring positioned over the pressure sensor base and forming an interference fit with the pressure sensor base. The sealing ring can be formed separate from or integral with the pressure sensor diaphragm.

In one embodiment of the invention, the sealing ring forms a mechanical interference with the pressure sensor base. For example, the pressure sensor base can include a sidewall and an undercut in the sidewall, and the sealing ring can be positioned within the undercut. In another embodiment, the pressure sensor base includes a recess having a bottom surface and a groove in the bottom surface, and the sealing ring and/or the pressure sensor diaphragm is positioned within the groove.

In another embodiment on the invention, the pressure sensor diaphragm generally defines a plane bisecting the package into an input side adjacent the sealing ring and an output side adjacent the pressure sensor base. The package further includes external threads on the output side of the package for securing the package to a threaded orifice.

BRIEF DESCRIPTION OF THE DRAWINGS

FIG. 1 is a perspective, exploded view of a pressure sensor package embodying the present invention.

FIG. 2 is a perspective section view of the pressure sensor package illustrated in FIG. 1 after assembly.

FIG. 3 is a partial section view of a pressure sensor package that is a second embodiment of the present invention before compression.

FIG. 4 is a view of the package shown in FIG. 3 after compression.

FIG. 5 is a partial section view of a pressure sensor package that is a third embodiment of the present invention before compression.

FIG. 6 is a view of the pressure sensor package shown in FIG. 5 after compression.

DETAILED DESCRIPTION

Figure 7:
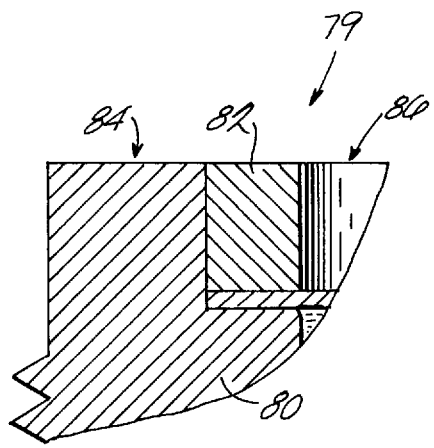
FIG. 7 is a partial section view of a pressure sensor package that is a fourth embodiment of the present invention before compression.

FIGS. 1 and 2 illustrate a pressure sensor assembly or package 20 embodying the present invention. The package 20 includes a pressure sensor base 22. The base 22 is preferably made from a metallic material, such as stainless steel or cold rolled steel, and includes a sidewall 30 defining a recess 32 in an upper surface 34 thereof, and a cavity 36 formed in a bottom of the recess 32.

The package 20 also includes a pressure sensor diaphragm 24 positioned over the base 22, and a pressure sensor sealing ring 26 which is engagable with the diaphragm 24 and with the base 22. The diaphragm 24 is not welded to the base 22 as with prior art designs, but rather is held in place by the sealing ring 26, as described below in more detail. Because the diaphragm 24 is not welded to the base 22, the diaphragm 24 can include non-metallic materials, such as elastomers, rubbers and plastics, and may also be made of metallic materials such as stainless steel and plated cold rolled steel. In the illustrated embodiment, the diaphragm 24 is made of stainless steel.

The base 22 includes threads 28 formed on an external surface thereof for securing the package 20 to a threaded port (not shown) for sensing fluid pressure within the port. The threads 28 are positioned to one side, i.e., on the output side, of a plane 29 defined by the diaphragm 24 which bisects the base 20 into an input side and an output side. Such placement of the threads 28 improves the strength of the base 22 by increasing the thickness of material that must be overcome in order for the base 22 to fail in the event excessive pressure is applied to the diaphragm 24. That is, such a failure would need to occur along a diagonal line from the diaphragm 24 to the lower edge of the threads 28, rather than straight across the side wall of the base 22 as would be the case if the threads extended across the plane 29 defined by the diaphragm 24.

Referring to FIG. 2, the package 20 also includes a pressure sensing chip 38 positioned within the cavity 36 and a plurality of wires 40 operatively inter-connected with the chip 38 and extending out the bottom 42 of the base 22. The pressure sensing chip 38 can be any appropriate chip for sensing fluid pressure, the selection of which will depend in part on the pressures to be sensed. For example, the pressure sensing chip 38 can be any of a variety of pressure transducers, such as those described in commonly assigned U.S. Pat. No. 5,507,171, U.S. Pat. No. 4,744,863, U.S. Pat. No. 4,853,669 and U.S. Pat. No. 4,996,082, all of which are incorporated herein by reference. The wires 40 are sealed within the base 22 by an appropriate sealing material 44, such as glass, in a conventional manner.

The package 20 also includes a pressure transfer media 46 positioned within the cavity 36 and covering the chip 38. The pressure transfer media 46 seals the cavity 36 between the diaphragm 24 and the chip 38 with little or no air in the cavity 36. The pressure transfer media 46 transfers pressure from deflection of the diaphragm 24 (e.g., caused by a change in pressure applied to the recess 32 side of the diaphragm 24) to the chip 38. In this regard, it is typically desirable to choose the pressure transfer media 46 to be a virtually incompressible and nonconductive material, such as is the case with some liquids and gels. In the illustrated embodiment, the pressure transfer media 46 is silicone gel.

The diaphragm 24 is positioned over the cavity 36 to provide a barrier to the entry of contaminants into the pressure transfer media 46 and the cavity 36, thereby prolonging the operational life of the chip 38.

The sealing ring 26 is positioned over the diaphragm 24 to hold the diaphragm 24 in place and to provide a seal to prevent entry of foreign materials into the cavity 36. The sealing ring 26 is designed to create an interference fit with the base 22. For example, in the embodiment illustrated in FIG. 2, the sealing ring 26 is press fit within the base 22. This can be accomplished by mechanically forcing the sealing ring 26 into the base 22 or, alternatively, by inserting the ring into the base 22 in a cooled condition to form a press fit upon warming the sealing ring 26. The sealing ring 26 can be made from a wide range of materials, such as plastic, stainless steel or cold rolled steel. In the illustrated embodiment, the sealing ring comprises stainless steel.

FIGS. 3 and 4 illustrate an assembly 48 which is an alternative embodiment of the present invention. In the alternative embodiment, the sealing ring 50 is plasticly deformed into the base 52. To enhance the engagement of the sealing ring 50 with the base 52, the inner surface of the side wall 54 of the base 52 is provided with a side groove 56, and the bottom surface of the recess 58 is provided with a bottom groove 60. The sealing ring 50 is dimension such that it engages the diaphragm 64 and extends slightly above the upper surface 62 of the base 52 prior to plastic deformation. The diaphragm 64 is sized to fill the recess 58.

The assembly 48 is then compressed until the upper surface 66 of the sealing ring 50 is about level with the upper surface 62 of the base 52. Such compression causes plastic deformation of both the sealing ring 50 and the diaphragm 64 so that both the side groove 56 and the bottom groove 60 are at least partially occupied by material. The provision of the grooves 56, 60 enhances the mechanical interference fit between the sealing ring 50 and the base 52, and further provides a more tortuous seal path to inhibit entry of contaminants into the cavity 68.

FIGS. 5 and 6 illustrate an assembly 70 which is a variation of the embodiment of the invention illustrated in FIGS. 3 and 4. In FIGS. 5 and 6, the diaphragm 72 is dimensioned such that it does not extend over the bottom groove 74 (i.e., the diaphragm 72 has a diameter that is slightly less than that of the recess 76). In this embodiment, the diaphragm 72 is not plasticly deformed into the bottom groove 74. Instead the sealing ring 78 is deformed to at least partially occupy the groove 74.

Figure 8:
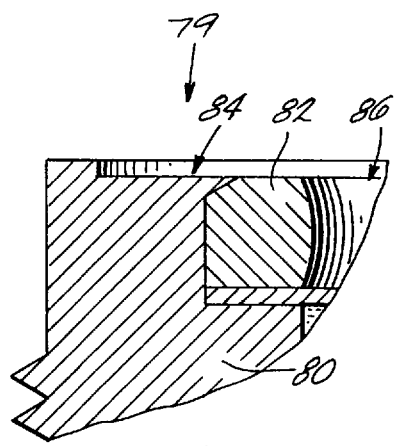
FIG. 8 is a view of the pressure sensor package shown in FIG. 7 after compression.

FIGS. 7 and 8 illustrate an assembly 79 which is yet another alternative embodiment of the present invention. As shown in FIG. 7, the base 80 is not provided with grooves, similar to the first embodiment. However, instead of press fitting the sealing ring 82 within the base 80, the sealing ring 82 is dimensioned to slide within the base 80, and an interference fit between the sealing ring 82 and the sidewall of the base 80 is created by compressing, or coining, the upper surface of the base 80. As shown in FIG. 8, both the upper surface 84 of the base 80 and the upper surface 86 of the sealing ring 82 are compressed, so as to deform of a portion of the base 80 into overlapping relation to the periphery of the sealing ring 82, thereby forming a mechanical interference between the base 80 and the sealing ring 82.

Figure 9:
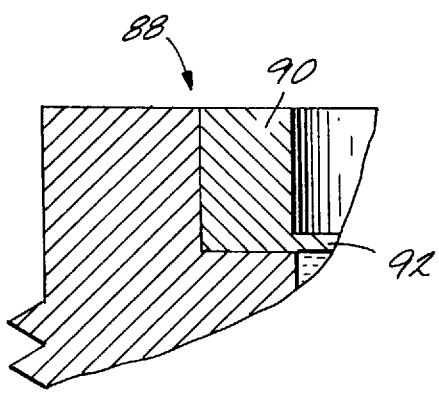
FIG. 9 is a partial section view of a pressure sensor package that is a fifth embodiment of the present invention before compression.
Figure 10:
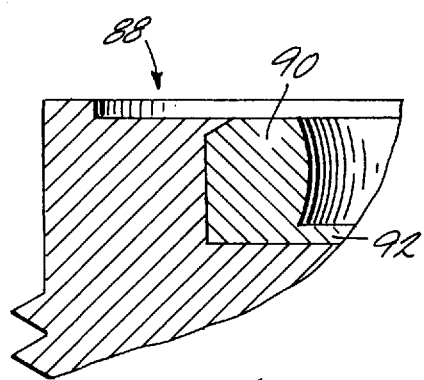
FIG. 10 is a view of the pressure sensor package shown in FIG. 9 after compression.

FIGS. 9 and 10 illustrate an assembly 88 that is an alternative embodiment of the invention. The assembly 88 includes a sealing ring 90 and a diaphragm 92 which are an integrally formed single piece of material. For example, the diaphragm 92 and sealing ring 90 could be machined from a single piece of stainless steel or, alternatively, molded from an elastomeric material.

The above-described and illustrated packages are assembled by positioning the diaphragm over the base in a position overlying the recess, placing the sealing ring over the diaphragm, and creating an interference fit between the sealing ring and the base by plasticly deforming (e.g., compressing) the sealing ring. For the package illustrated in FIGS. 9–10, of course, the steps of positioning and placing are performed simultaneously.

For the packages illustrated in FIGS. 3–10, the interference fit is created by a mechanical interference between the sealing ring and the base. The mechanical interference in FIGS. 3–6 is formed by plasticly deforming the sealing ring into the undercut in the sidewall of the base. In FIGS. 7–10, the mechanical interference is formed by deforming a portion of the pressure sensor base over a portion of the sealing ring (e.g., by plasticly deforming both the sealing ring and the base). For the packages of FIGS. 3–6, the method further includes the step of plasticly deforming the sealing ring and/or the diaphragm into the groove.

The foregoing description of the invention is for the purposes of illustration and description, and does not limit the invention to the form disclosed herein. Variations and modifications commensurate with the above teachings and with the skill or knowledge of the relevant art are within the scope of the present invention. For example, the materials used for the various components of the packages could vary from those described, depending on design constraints such as temperature, pressure and environmental issues. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A pressure sensor package comprising:

a pressure sensor base having a sidewall defining a recess; said pressure sensor base also defining a cavity opening into said recess;

a pressure sensor diaphragm received by said recess and positioned in overlapping relation to said cavity; and a sealing ring received by said recess and engaged with said sidewall, wherein one of said sidewall and said sealing ring is deformed so that engagement of said sealing ring and said sidewall forms an interference fit therebetween to secure said pressure sensor diaphragm to said pressure sensor base and to seal said cavity and wherein said sidewall is deformed so that a portion of said sidewall extends into said recess to engage a portion of said sealing ring.

2. A pressure sensor package comprising:

a pressure sensor base having a sidewall defining a recess, said pressure sensor base also defining a cavity opening into said recess;

a pressure sensor diaphragm received by said recess and positioned in overlapping relation to said cavity; and a sealing ring received by said recess and engaged with said sidewall, wherein one of said sidewall and said sealing ring is deformed so that engagement of said sealing ring and said sidewall forms an interference fit therebetween to secure said pressure sensor diaphragm to said pressure sensor base and to seal said cavity and wherein said sidewall is deformed so that a portion of said sidewall overlaps a portion of said sealing ring.

3. A pressure sensor package comprising:

a pressure sensor base having a sidewall defining a recess; said pressure sensor base also defining a cavity opening into said recess;

a pressure sensor diaphragm received by said recess and positioned in overlapping relation to said cavity; and a sealing ring received by said recess and engaged with said sidewall, wherein one of said sidewall and said sealing ring is deformed so that engagement of said sealing ring and said sidewall forms an interference fit therebetween to secure said pressure sensor diaphragm to said pressure sensor base and to seal said cavity, and wherein said sidewall and said sealing ring each are deformed so that said sealing ring is secured within said recess.

4. A pressure sensor package comprising:

a pressure sensor base including a sidewall and a bottom surface, said sidewall and said bottom surface cooperating to form a recess and a cavity opening toward said recess;

a pressure sensor diaphragm positioned within said recess and in overlapping relation to said cavity; and a sealing ring positioned within said recess, said sealing ring being engaged with said sidewall and forming a seal with said sidewall, and said sealing ring retaining said pressure sensor diaphragm within said recess, wherein said sidewall is deformed so that a portion of said sidewall extends into said recess to engage a portion of said sealing ring.

5. A pressure sensor package comprising:

a pressure sensor base including a sidewall and a bottom surface, said sidewall and said bottom surface cooperating to form a recess and a cavity opening toward said recess;

a pressure sensor diaphragm positioned within said recess and in overlapping relation to said cavity; and a sealing ring positioned within said recess, said sealing ring being engaged with said sidewall and forming a seal with said sidewall, and said sealing ring retaining said pressure sensor diaphragm within said recess, wherein said sidewall is deformed so that a portion of said sidewall overlaps a portion of said sealing ring.

6. A pressure sensor package comprising:

a pressure sensor base including a sidewall and a bottom surface, said sidewall and said bottom surface cooperating to form a recess and a cavity opening toward said recess;

a pressure sensor diaphragm positioned within said recess and in overlapping relation to said cavity; and a sealing ring positioned within said recess, said sealing ring being engaged with said sidewall and forming a seal with said sidewall, and said sealing ring retaining said pressure sensor diaphragm within said recess, wherein said sidewall and said sealing ring each are deformed so that said sealing ring is retained within said recess.

7. A pressure sensor package comprising:

a pressure sensor base including a sidewall defining a recess, said pressure sensor base also defining a cavity opening into said recess; and a one-piece, integrally formed pressure sensor diaphragm received by said recess, said pressure sensor diaphragm including an inner portion extending over said cavity, and an outer portion engaging said sidewall; wherein one of said sidewall and said outer portion of said pressure sensor diaphragm is deformed to form an interference fit therebetween so that said pressure sensor diaphragm is sealingly secured to said pressure sensor base and so that said cavity is sealed and wherein said sidewall is deformed so that a portion of said sidewall overlaps a portion of said outer portion of said pressure sensor diaphragm.

* * * * *